United States Patent [19]

Sawa et al.

[11] Patent Number: 5,054,115

[45] Date of Patent: Oct. 1, 1991

[54] RADIO TELEPHONE APPARATUS

[75] Inventors: Buntaro Sawa, Sagamihara; Noboru Koike, Tama, both of Japan

[73] Assignee: Kabushiki Kaisha Toshiba, Kawasaki, Japan

[21] Appl. No.: 249,817

[22] Filed: Sep. 27, 1988

[30] Foreign Application Priority Data

Sep. 28, 1987 [JP] Japan .................................. 63-243011

[51] Int. Cl.$^5$ .............................................. H04Q 7/04
[52] U.S. Cl. ...................................... 455/89; 455/90; 379/61
[58] Field of Search ................... 455/89, 90, 343, 347, 455/349, 127–129, 11; 379/60, 63, 59, 61; 307/139, 140

[56] References Cited

U.S. PATENT DOCUMENTS

| | | | |
|---|---|---|---|
| 3,087,117 | 4/1963 | Mitchell | 455/100 |
| 4,636,741 | 1/1987 | Mitzlaff | 455/89 |
| 4,700,375 | 10/1987 | Reed | 455/89 |
| 4,706,274 | 11/1987 | Baker et al. | 379/61 |
| 4,845,738 | 7/1989 | Takano | 455/90 |

*Primary Examiner*—Curtis Kuntz
*Attorney, Agent, or Firm*—Finnegan, Henderson, Farabow, Garrett, and Dunner

[57] ABSTRACT

A radio telephone apparatus including a portable radio device capable of being mounted on and carried out from a vehicle such as an automobile in use. The portable radio device has a transmission-reception antenna accommodatable therein and is connected via a removable coaxial cable with an additional unit mounted on the vehicle. When the radio device is connected to the additional unit via the coaxial cable, a transmission-reception antenna fixed to the vehicle is connected to the radio unit of the portable radio device via the coaxial cable whereas when the portable radio device is removed from the additional unit, the accommodatable transmission-reception antenna is connected to the radio unit of the radio device.

28 Claims, 7 Drawing Sheets

RADIO TELEPHONE APPARATUS

BACKGROUND OF THE INVENTION

1. Field of the Invention

The present invention relates to radio telephone apparatus which are mounted and used on vehicles such as automobiles and, more particularly, to radio telephone apparatus which include a portable radio device removable outside the vehicles.

2. Description of the Related Art

Automobile telephone devices are known as radio telephone apparatus used in vehicles such as automobiles. In the automobile telephone device, a dial signal and a communication signal are transmitted from a handset disposed at the seat of the automobile via a transceiver installed, for example, in the trunk to the base station through which the telephone device makes telephone communication with a remote cable telephone or a remote radio telephone apparatus. According to this structure, the handset at the automobile seat cannot be removed from the transceiver in the trunk, so that the handset cannot be moved outside the automobile to make telephone communication.

Radio telephone apparatuses have been developed which are capable of making telephone communication either inside or outside the vehicle. FIG. 9 is a block diagram of such conventional radio telephone apparatus which includes a portable radio device 1, a vehicle-mounted additional unit 2, a handset 3 and a handset cradle 4.

The radio device 1 is fixed usually in a recess in the additional unit 2. A chargeable battery 11 is charged with a charging current which flows from the automobile battery (not shown), via a power cable 20, a connector 21 of the unit 2, and a connector 10 mounted on the back of radio device 1.

The radio device 1 includes a telephone mouthpiece 12 and a telephone earpiece 13 for telephone communication, a control panel 14 including dial keys, etc., operated for transmitting and receiving calls, a telescopic antenna 15, and a transmitter-receiver, a voice circuit, etc., provided therein.

The additional unit 2 includes an antenna cable 22 which is connected to a transmitter-receiver antenna 5 fixed outside the vehicle, and a voice cable 23 through which a communication signal is transmitted and received by the transmitter-receiver in the radio device 1 via the handset cradle 4 to and from a telephone mouthpiece 30 and a telephone receiver 31 of the handset 3.

The handset 3 has a curl cord 32 which transmits a telephone communication signal. When the handset 3 is placed on the cradle 4, valleys (not shown) in the handset between the telephone mouthpiece and earpiece 30 and 31 are engaged with resilient pawls 40 and 41 of the cradle 4 for fixing purposes.

In operation, when the antenna 5 fixed to the vehicle receives an incoming signal from a calling telephone apparatus via the base station (not shown), the received signal is delivered via the antenna cable 22, and connectors 21, 10 to the transmitter-receiver of the radio device 1. The transmitter-receiver demodulates the received signal and generates a ringing tone from a sounder (not shown) of the radio device 1 to call the user. When the user operates an off-hook switch (not shown) provided at the control panel 14 of the radio device 1 in response to the ringing tone, a telephone communication path is established between the radio device 1 and the calling telephone apparatus via a radio link. Thus when the handset 3 is lifted from the handset cradle 4, telephone communication is enabled through the telephone mouthpiece and earpiece 30 and 31 of the handset 3.

The voice signal from the telephone mouthpiece 30 of the handset 1 is delivered as a modulation signal for the carrier signal through the curl code 32, cradle 4, voice cable 23, connector 21 of the additional unit 2, and connector 10 of the radio device 1 to the transmitter-receiver of the radio device 1. The modulated output from the radio device 1 is transmitted via the connectors 10, 21, and antenna cable 22 from the antenna 5.

If the off-hook and dialing operations are performed at the control panel 14 of the radio device 1 for transmitting a call signal from the vehicle, the dialing signal is delivered as a modulation input to the transmitter-receiver where it is converted to a high frequency signal and transmitted via connectors 10, 21 and antenna cable 22 from the antenna 5. A telephone communication path is established by the off-hook response of the called apparatus as in the reception of the call.

When the radio device 1 is removed from the additional unit 2 and used outside the vehicle, the antenna 15 of the radio device 1 is set in a transmission-reception enable state by extending the antenna 15 to thereby transmit and receive calls directly to and from the base station. When a communication path to the called apparatus is established, telephone communication is possible using the telephone mouthpiece and earpiece 12 and 13.

As just mentioned above, telephone communication is possible both inside and outside the vehicle according to this arrangement.

Since the handset 3 includes only the telephone mouthpiece and earpiece, the off-hook and dialing operations must be performed at the control panel 14 of the radio device 1. Therefore, the radio device 1 and handset 3 are required to be disposed close to each other.

Since many drive meters or the like are disposed in the vicinity of the driver seat of the automobile, it is often difficult to select a space where the radio device 1, additional unit 2, handset 3 and handset cradle 4 are installed. Even if they are installed, they may hinder the driver's operations, so that there is nothing for it but to select an installation place inconvenient to operate the telephone apparatus.

It is therefore an object of the present invention to provide a radio telephone apparatus which occupies a small installation space in a vehicle such as an automobile.

SUMMARY OF THE INVENTION

The present invention provides a radio telephone apparatus comprising an additional unit connecting a first transmission-reception antenna thereto; a portable radio device connected removably via a coaxial cable to the additional unit and including a second transmission-reception antenna and a radio unit; and transmission-reception antenna changing means for connecting the radio unit to the first transmission-reception antenna via the coaxial cable when the radio device is connected to the additional unit and for connecting the radio unit to the second transmission-reception antenna when the radio device is removed from the additional unit.

The present invention achieves the above object by providing a radio telephone apparatus which includes a portable radio device having an accommodatable or telescopic transmission and reception antenna, an additional unit mounted in the vehicle, a transmission and reception antenna fixed to the vehicle, and a removable coaxial cable connecting the portable radio device and additional unit. The radio device includes a control panel for performing operations to place and receive calls, a telephone mouthpiece and earpiece and a voice circuit for telephone communication, a battery for feeding power to the respective required elements of the apparatus, and a transmitter-receiver unit for transmitting and receiving, by radio, a telephone communication signal to and from another radio apparatus using one of the accommodatable or fixed transmission-reception antennas. The additional unit includes a rest mechanism for resting thereon the portable radio device removably.

The portable radio device is usually fixed by the rest mechanism of the additional unit and connected to the transmission-reception antenna fixed to the vehicle via the coaxial cable. Under such conditions, if there is an incoming call, the received signal from the transmission-reception antenna fixed to the vehicle is input to the transmission-receiver unit of the portable radio device via the coaxial cable and demodulated thereby. By the off-hook operation at the radio device, a communication path with the calling apparatus is established via the transmission-reception antenna fixed to the vehicle, and telephone communication is possible using the telephone mouthpiece and earpiece of the portable radio device.

When the portable radio device is to be used outside the vehicle, the coaxial cable is removed, the transmission-reception antenna of the radio device is placed in a transmission-reception enable state and a calling operation or an incoming call processing operation is performed. In this case, a telephone communication path is established via the transmission-reception antenna of the radio device and telephone communication is possible via the telephone mouthpiece and earpiece.

As just described above, the portable radio device is used as a telephone handset in common for communication both inside and outside the vehicle, and only one of the transmission-reception antenna fixed to the vehicle or the transmission-reception antenna of the portable radio device is selected in use. Thus the conventional handset and the cradle therefor are not required, so that their space is saved which would otherwise be needed. Therefore, the selection of the place where the telephone apparatus is installed is very easy.

DESCRIPTION OF THE PREFERRED EMBODIMENTS

Figure 1:
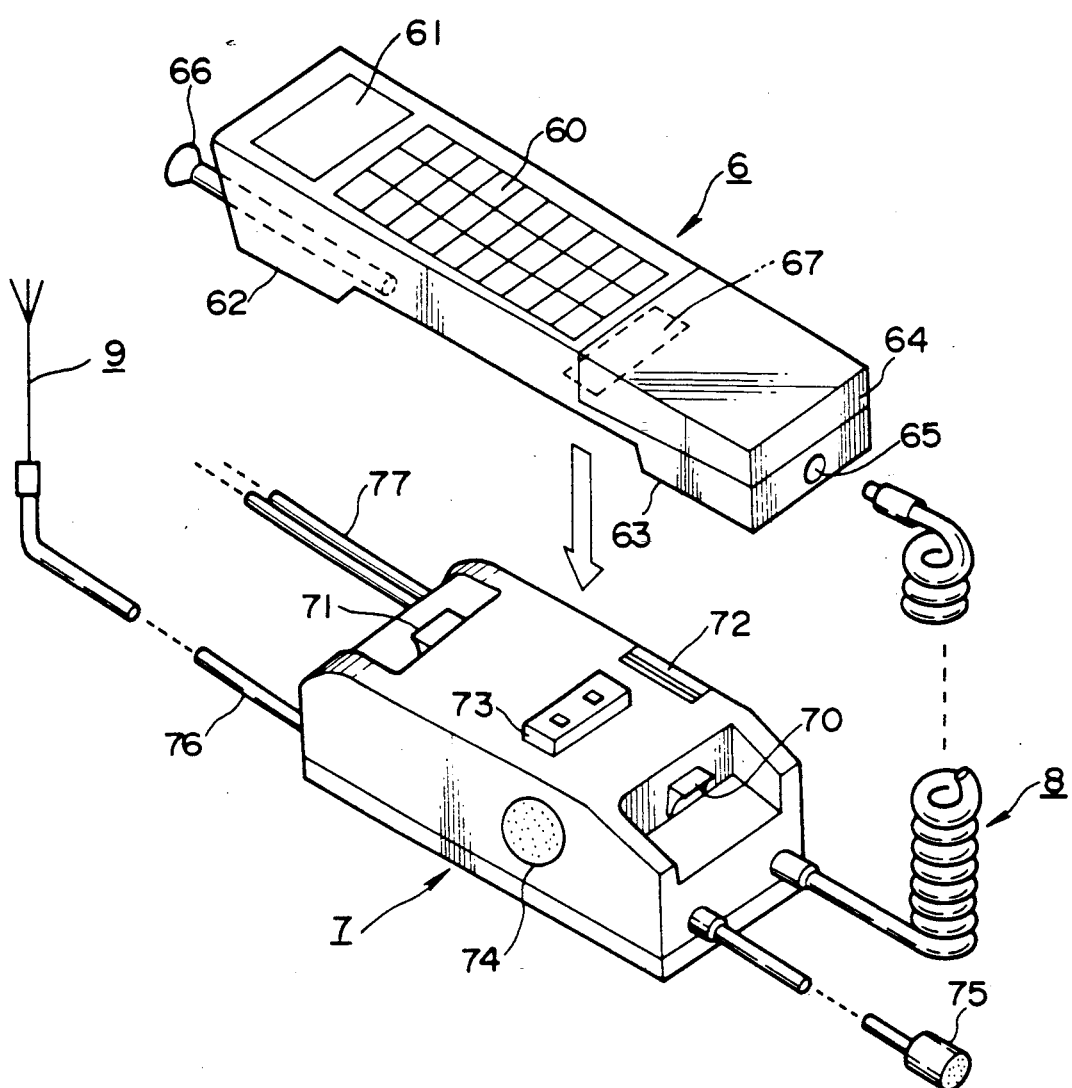
FIG. 1 is a perspective view of one embodiment of the present invention.

FIG. 1 is a schematic showing one embodiment of the present invention, and mainly includes a portable radio device 6, a vehicle-mounted additional unit 7, a coaxial cable 8, a vehicle-mounted transmission and reception antenna 9.

The radio device 6 includes a control panel 60 which is operated to transmit and receive calls, a display 61 which displays a dial number used for transmitting a call, a telephone earpiece 62, a telephone mouthpiece 63, a chargeable battery 64, a connector 65 for the coaxial cable 8, an accommodatable telescopic antenna 66, and a transmitter, a receiver and a voice circuit provided therein to be described later in more detail.

The additional unit 7 has a pair of resilient pawls 70 and 71 engageable in valleys in the radio device body between the telephone earpiece and mouthpiece 62 and 63 of the radio device 6 to fix same, a disengaging unit 72 which disengages pawls 70 and 71 from the valleys, a connector 73 connected to a connector 67 fixed to the telephone mouthpiece and receiver surface of the radio device 6, a speaker 74 and a microphone 75 for hand-free operation, an antenna 9 connected via an antenna cable 76 to the additional unit, and a power cable 77 receiving battery power for the automobile.

The radio device 6 is usually fixed by the resilient pawls 70 and 71 when placed on the additional unit 7. At this time, the connectors 73 and 67 are connected and a charging current is supplied via the connectors 73 and 67 to the battery 64 of the radio device 6, and the input to and output from the voice circuit of the radio device 6 are connected to the microphone 75 and speaker 74 of the additional unit 7 via connectors 73 and 67.

Figure 2:
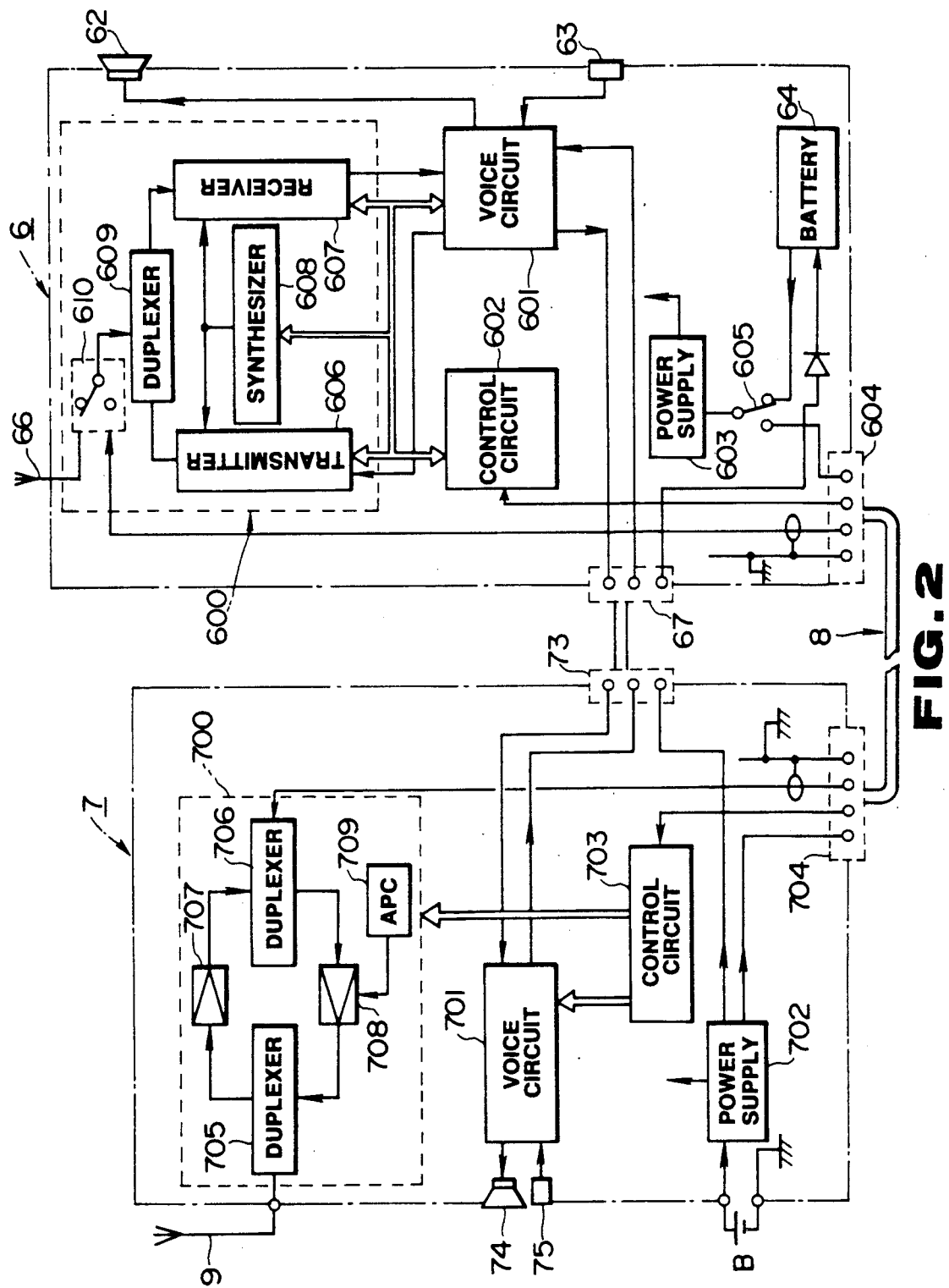
FIG. 2 is a circuit block diagram showing the detailed structure of a portable radio device and a vehicle-mounted additional unit.

FIG. 2 is a circuit block diagram showing the detailed structure of the radio device 6 and additional unit 7. The radio device 6 includes a transmitter-receiver unit 600, a voice circuit 601, a control circuit 602, a battery 64 or a power supply 603 which converts a power source voltage supplied from the additional unit 7 via the coaxial cable 8, to voltages used by the respective circuit elements of the radio device 6, a connector 604 for the coaxial cable 8, and a power source switch 605 which selects one of the output from the battery 64 and the power source voltage from the additional device 7 and supplies the selected voltage to the power supply 603.

The transmitter-receiver unit 600 includes a transmitter 606, a receiver 607, a synthesizer 608 which sets the frequencies used for the transmitter and receiver 606 and 607, an antenna duplexer 609, and an antenna changer 610 which selects one of the antenna 9 and a radio device antenna 66 and connects the selected one to the antenna duplexer 609.

Figure 3:
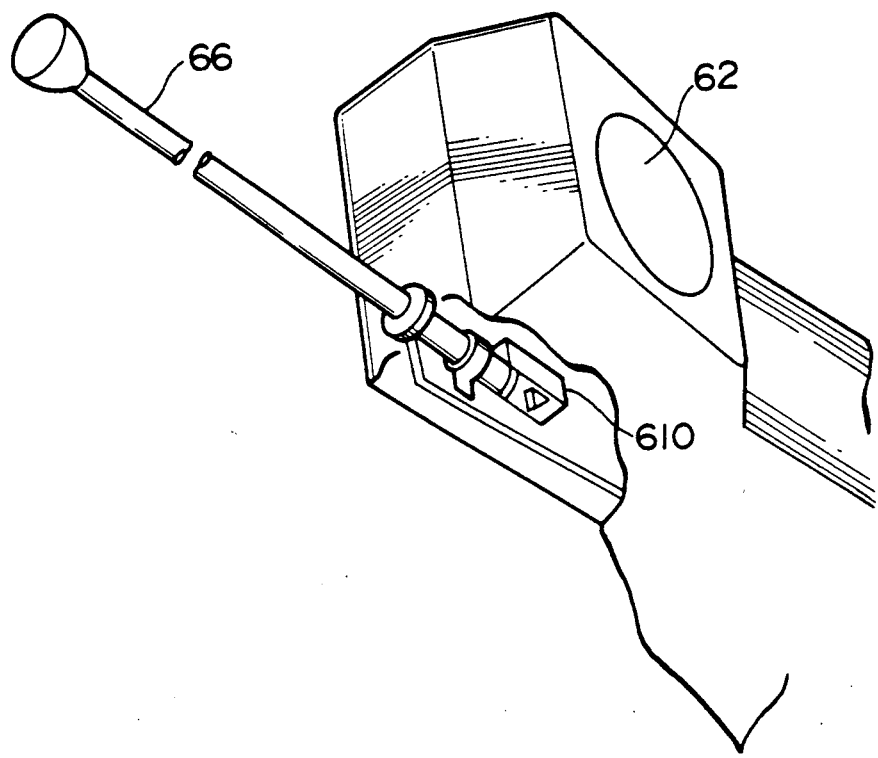
FIG. 3 is a schematic showing a specific example of an antenna changer.

The antenna changer 610 includes a limit switch which, for example, senses the state in which the antenna 66 is accommodated, as shown in FIG. 3, and connects the antenna 66 to the duplexer 609 only when the antenna 66 is extended for transmission and reception purposes.

Figure 4:
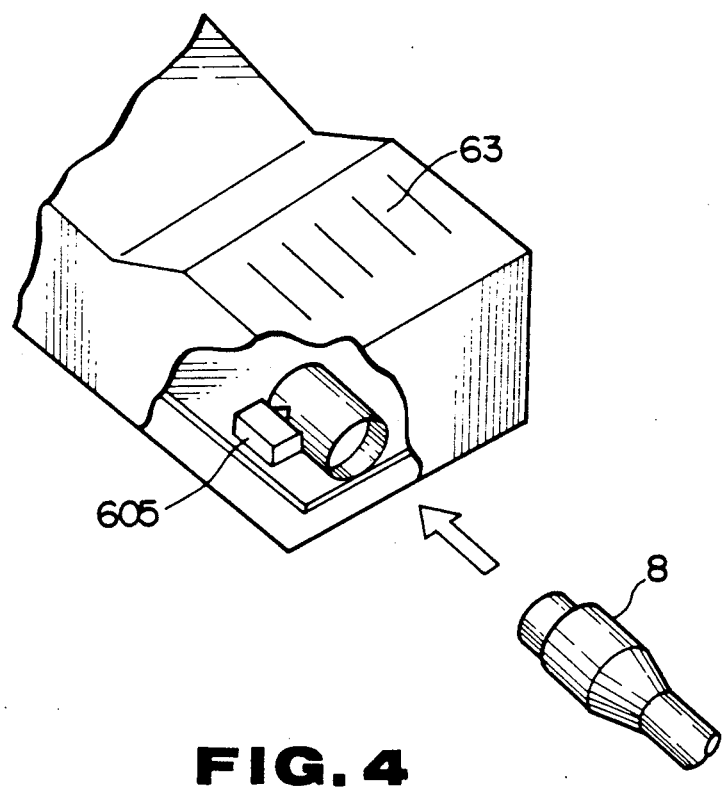
FIG. 4 is a schematic showing a specific example of a power source switch.

The power source switch 605 includes a limit switch which is operated, for example, when the coaxial cable 8 is attached to the connector 604, as shown in FIG. 4, to connect the input to the power supply 603 to the additional device.

Figure 5:
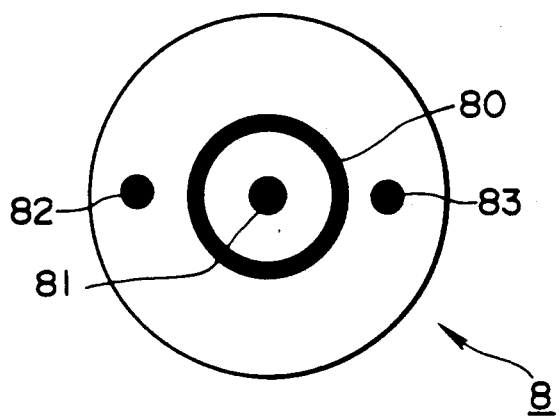
FIG. 5 is a cross section view of a cable used in the embodiment.

In addition to the input to the power supply 603, a control signal line of the control circuit 602, a high frequency signal line to the antenna changer 610 and a ground potential line are connected to the connector 604. Therefore, as shown in FIG. 5, the coaxial cable 8 includes a 4-core cable which includes a ground potential line 80, a high frequency signal line 81, a control signal line 82 and a power source voltage line 83. A control signal is transmitted and received in a serial manner between the control circuit 602 of the radio device 6 and the control circuit 703 of the additional unit 7 via the control line 82.

The additional unit 7 includes a booster 700 which amplifies to predetermined power high frequency signals transmitted and received via the antenna 9, a voice circuit 701 connected between the connector 73 and the speaker 74, microphone 75, a power supply 702 which converts a direct current voltage from a vehicle-mounted battery B to predetermined voltages which are then supplied to the respective circuits of the additional unit and supplies a voltage to the portable radio device via the coaxial cable 8, a control circuit 703 which controls the booster 700 and voice circuit 701, and a connector 704 connected to the coaxial cable 8.

The booster 700 includes antenna duplexers 705, 706, a reception amplifier 707, a transmission power amplifier 708, and an automatic power control circuit (APC) 709 which controls the output level of the transmission power amplifier.

In the arrangement, the additional unit 7 is fixed close to the driver's seat in the vehicle, and the radio device 6 is connected to the additional unit 7 via the cable 8 and fixed above the additional unit 7. This is a standby state in which the connector 67 of the radio device 6 is connected to the connector 73 of the additional unit 7, so that the input and output of the voice circuit 601 of the radio device 6 are connected to the voice circuit 701 of the additional unit 7 via these connectors 67 and 73. The battery output voltage supplied via the power source cable 77 is converted by the power supply 702 of the additional unit 7 to predetermined voltages, which are then supplied via the coaxial cable 8 to the power supply 603 of the radio device 6, which power supply 603 supplies required voltages to the respective circuits of the radio device 6. The power supply 702 also supplies a voltage to the battery 64 of the radio device 6 via connectors 67 and 73 to thereby charge the battery 64.

In the standby state, the antenna 66 of radio device 6 is accommodated within the radio device, so that the antenna changer 610 selects the vehicle-mounted antenna. Therefore, the transmitter 606 and receiver 607 are connected to the vehicle-mounted antenna 9 via the antenna changer 610 and coaxial cable 8.

When an incoming signal from a remote cable telephone or radio telephone apparatus is received by the antenna 9 via the base station, the received signal is amplified to constant power by the booster 700, the amplified signal is then input via the connector 704, cable 8, connector 604, antenna changer 610 and antenna duplexer 609 to the receiver 607 where the signal is demodulated. The dial number data contained in the demodulated signal is input to the control circuit 602, and compared with a dial number allocated beforehand to the radio device 6. When the comparison shows that both the dial numbers coincide, the control circuit 602 causes the voice circuit 601 to output a ringing tone signal. This ringing tone signal is input via the connector 67 and 73 to the voice circuit 701 of the additional unit 7 and converted to a loud ringing tone generated from the speaker 74.

When the user performs an off-hook switch operation at the control panel 60 of the radio device 6 in response to the ringing tone, the off-hook response signal is input via the transmitter 606 and coaxial cable 8 to the booster 700 of the additional unit 7 where the signal is amplified to constant power. The amplified signal is then transmitted toward the base station from the vehicle-mounted antenna 9. Thus a telephone communication path using a radio circuit is established via the base station to thereby enable telephone communication. When a voice signal from the remote apparatus is received by the antenna 9, the received voice signal is input to the receiver 607 via the same path as the incoming call signal and demodulated by the receiver. The demodulated voice signal is input to the voice circuit 701 of the additional unit 7 via the voice circuit 601 and connectors 67 and 73. The signal is then amplified by the voice circuit 701 and broadcasted by the speaker 74.

When the user responds vocally to the voice signal from the remote apparatus, the user's voice is detected by the microphone 75 and input to the transmitter 606 via the voice circuit 701, connectors 73 and 67 and voice circuit 601. This signal becomes a modulation signal for the carrier and is converted to a high frequency signal which is then transmitted from the vehicle-mounted antenna 9 via the antenna changer 610, cable 8 and booster 700.

The above indicates that telephone communication is made between the radio device 6 placed on the additional unit 7 and the remote apparatus. If the radio device 6 is removed from the additional unit 7 after the communication path with the remote apparatus is established, the connection between the connectors 73 and 67 is interrupted. Therefore, only the telephone earpiece and mouthpiece 62 and 63 are connected to the voice circuit 601, so that telephone communication is possible using these telephone earpiece and mouthpiece 62 and 63.

Therefore, by using the radio device 6 removed from the additional unit 7, it is possible to talk about a matter which is not to be heard by the passengers in the vehicle.

When it is desired to make a call from the radio device 6, an off-hook switch operation is performed at the control panel 60 and the called apparatus is dialed. A signal indicative of the dial number is input via the control circuit 602 to the transmitter 606 where the signal is converted to a high frequency signal and transmitted via the antenna changer 610, cable 8, and booster 700 from the antenna 9. When this signal is responded by the called device, a telephone communication path is established in the same manner as when an incoming call is received, and telephone communication is possible.

When the radio device 6 is to be used outside the vehicle, the cable 8 is disconnected from the connector 604 and the radio device 6 is removed from the vehicle. The antenna 66 is then extended so as to enable transmission and reception. By disconnection of the cable 8, the power source switch 605 switches the input to the power supply 603 to the battery 64. Thus, the power supply 603 generates power source voltages required by the respective circuits of the radio device 6 on the basis of the output voltage from the battery 64 and supplies the voltages to the circuits. On the other hand, by setting the antenna 66 in the transmission-reception enable state, the antenna changer 610 switches such that the antenna duplexer 609 is connected to the antenna 66.

Thus, a telephone communication signal and a call signal are transmitted and received via the antenna 66 to thereby enable telephone communication completely irrespective of the additional unit 7 in contrast with the manner in which the radio device 6 is used inside the vehicle.

If the telephone communication outside the vehicle is completed, the additional unit 7 is connected to the radio device 6 via the cable 8, the radio device 6 is placed on and fixed to the additional unit 7 for standby purposes.

As just described above, in the particular embodiment, the radio device 6 and additional unit 7 are connected via the cable 8. Thus when the radio device 6 is used inside the vehicle, high frequency signals from and to the transmitter and receiver of the radio device 6 are transmitted and received via the vehicle-mounted antenna 9 whereas when the radio device is used outside the vehicle, the cable 8 is removed, high frequency signals to and from the transmitter and receiver are transmitted and received using the antenna 66 of the radio device 6. Therefore, the conventional handset and rest therefor become unnecessary to thereby save a space therefor.

The loudspeaker or voice amplification telephone communication function is provided, so that telephone communication can be made without hindering the vehicle driving. The control panel 60 used for transmitting and receiving calls is disposed on the back side of the telephone earpiece and mouthpiece 62 and 63, namely, on the top of the radio device 6 when same is placed on the additional unit 7, so that operations for transmitting and receiving calls are performed without lifting the radio device 6. Thus this arrangement is very convenient in operability. When the vehicle-mounted antenna 9 is used, the signal is amplified by the booster 700, so that high-sensitivity telephone communication with a remote radio apparatus is provided.

While power to the radio device 6 is supplied via the voice signal transmission connectors 67, 73 and the special-purpose cable, it may be supplied via the connector 704, cable 8 and connector 604.

While the additional unit 7 has the hand-free communication function provided by the speaker 74, microphone 75 and voice circuit 701, this function may be provided as needed.

While the antenna changer 610 determines which one of the antennas 66 and 9 should be used, it may includes any conventional detector which electrically, mechanically or optically detects whether the antenna 66 is in a transmission and reception enable state, and a switch switched in accordance with the output from the detector, instead of the limit switch shown in FIG. 3.

The power source switch 605 may include any conventional detector which electrically, mechanically or optically detects whether the cable 8 is connected to the connector 604 and a switch switched in accordance with the output from the detector, instead of the limit switch shown in FIG. 4.

The arrangement of FIGS. 1 and 2 may be modified such that the connectors 67 and 73 are removed, and that the signals which would otherwise be transmitted via the connectors 67 and 73 should be transmitted via the connector 704, cable 8 and connector 604. Such structure is shown in FIGS. 6 and 7 as another embodiment of the present invention.

Figure 6:
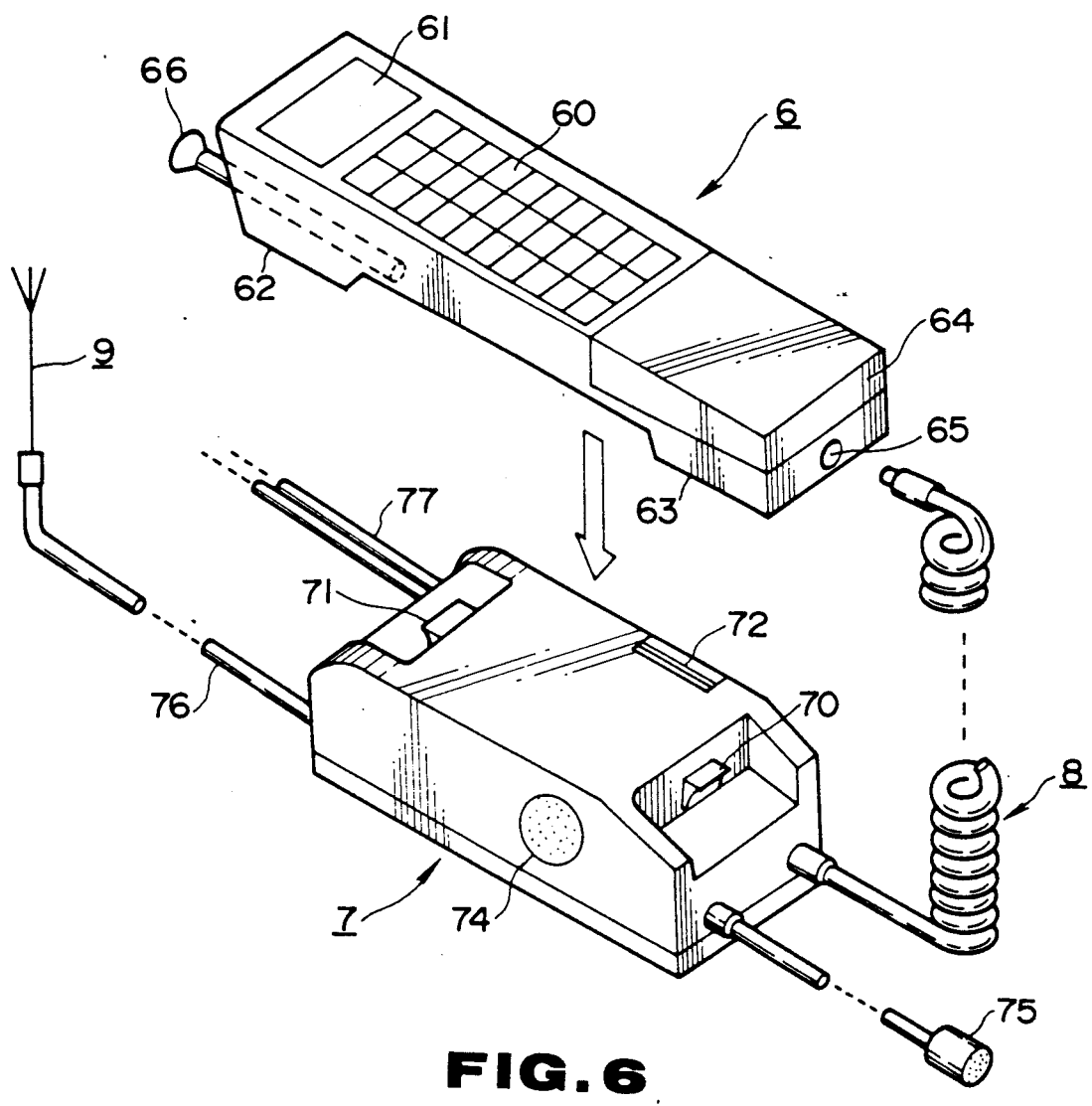
FIG. 6 is a perspective view of a further embodiment.

In FIG. 6, connectors such as the connectors 67 and 73 of FIG. 1 are not used. A signal line similar to the line 8 passing through the connector 67 and 73 is accommodated in the coaxial cable 8 and the signals which would otherwise be transmitted via the connectors 67 and 73 are transmitted via the cable 8.

Figure 8:
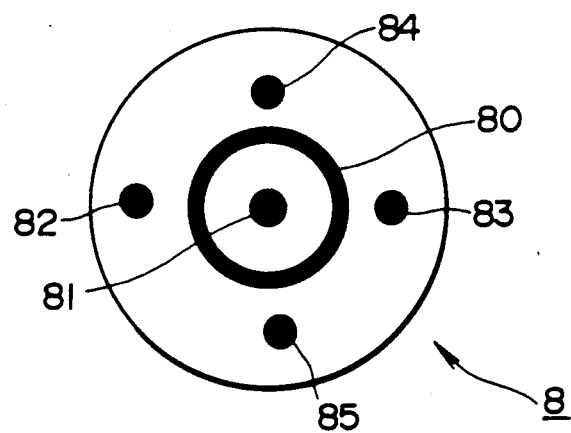
FIG. 8 is a cross section schematic of a cable used in the further embodiment.
Figure 7:
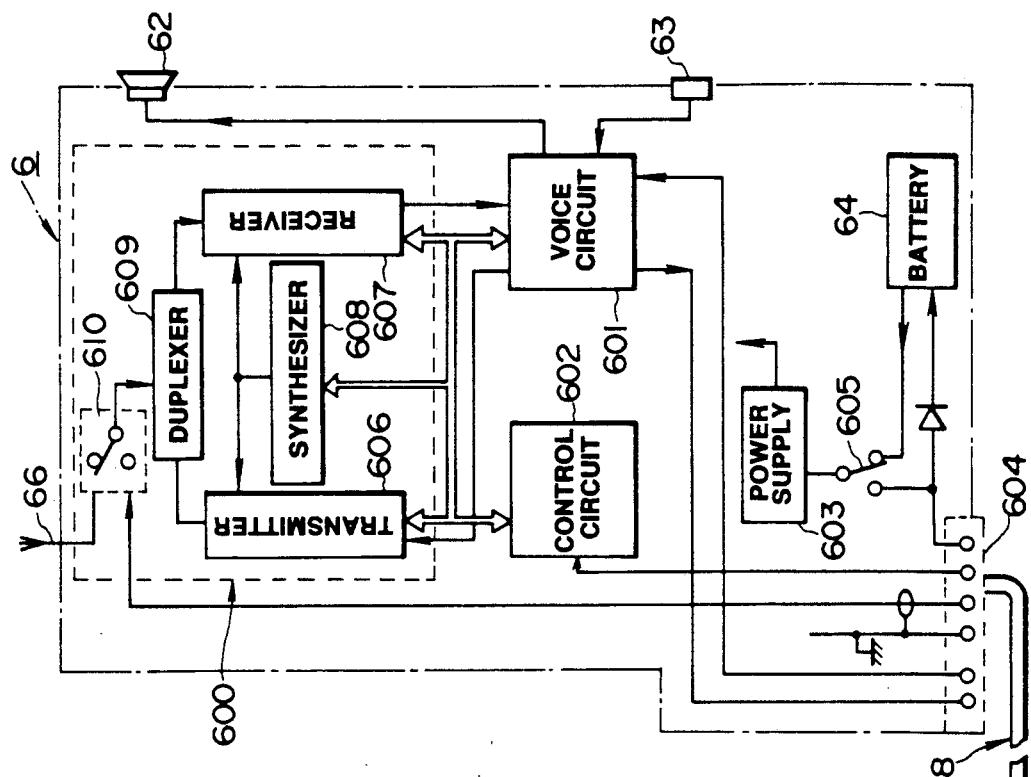
FIG. 7 is a circuit block diagram showing the detailed structure of a portable radio device and a vehicle-mounted additional unit in the further embodiment.
Figure 9:
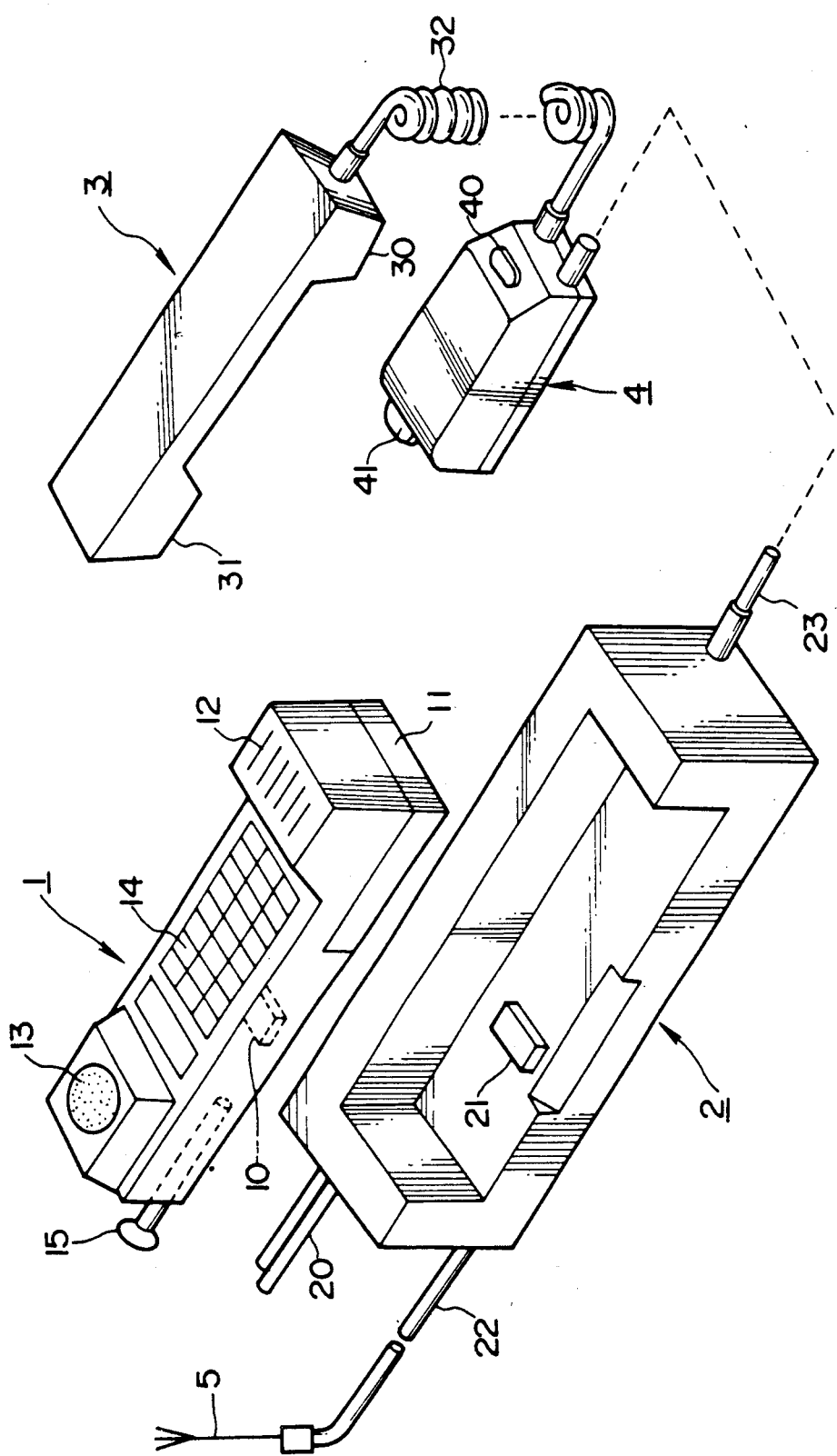
FIG. 9 is a block diagram showing the structure of a conventional radio telephone apparatus.

FIG. 7 shows in a block diagram the detailed structure of the radio device 6 and vehicle-mounted additional unit 7 in the particular embodiment. In FIG. 7, connectors such as the connectors 67 and 73 are not used. Signals such as those transmitted through the connectors 67 and 73 are transmitted through the connector 704, cable 8 and connector 604. As shown in FIG. 8, the coaxial cable 8 includes a 6-core cable which comprises a ground potential line 80, a high frequency signal line 81, a control signal line 82, a power source voltage line 83, and voice signal lines 84, 85.

What is claimed is:

1. A radio telephone apparatus comprising:
   a portable radio device accommodating a transmission-reception antenna therein;
   an additional unit mounted on a vehicle;
   a transmission and reception antenna fixed to the vehicle; and
   a coaxial cable removably connecting the radio device and the additional unit;
   the radio device including:
   a control panel operated for the transmission and reception of calls;
   a telephone transmitter-receiver and a voice circuit for making telephone communication;
   a connector for transmitting telephone signals between the voice circuit and the additional unit;
   a battery for supplying power of the above-mentioned elements of the apparatus;
   a transmitter-receiver for transmitting and receiving telephone communication signals by radio between the telephone transmitter-receiver and another radio apparatus;
   an antenna changer for detecting whether the transmission-reception antenna accommodated in the radio device is in a transmission-reception enable state, connecting that transmission-reception antenna to the transmitter-receiver when the transmission-reception antenna is in the transmission-reception enable state, and for connecting the transmission-reception antenna fixed to the vehicle to the transmitter-receiver via the coaxial cable when the accommodated transmission-reception antenna is in a transmission-reception disable state; and
   the additional unit including:
   a rest mechanism for receiving the radio device removably thereon;
   a voice amplifying telephone transmitter-receiver; and
   a connector connected to the connector of the radio device to connect the voice amplifying transmitter-receiver to the voice circuit when the radio device is mounted on the rest mechanism.

2. A radio telephone apparatus comprising a portable radio device, an additional unit mounted in a vehicle and connectable to the portable radio device through a cable, and a vehicle antenna provided on the vehicle, wherein:
   the portable radio device includes:

a portable antenna for receiving or transmitting radio frequency signals;
a first terminal connected to the portable antenna;
a second terminal connected to a connector of the portable radio device;
a third terminal;
first duplexer means, connected to the third terminal, for applying transmission signals to the third terminal and extracting reception signals out of the signals from the third terminal;
transmitter means, coupled to a transmission terminal of the first duplexer means, for providing transmission signals to the first duplexer means;
receiver means, coupled to a reception terminal of the first duplexer means, for receiving reception signals from the first duplexer means; and
switching means for selectively connecting the third terminal to either one of the first terminal or the second terminal;
the additional unit includes:
second duplexer means, coupled to the vehicle antenna, for applying transmission signals to the vehicle antenna and extracting reception signals out of the signals from the vehicle antenna; and
third duplexer means, coupled to the second duplexer means, for applying the reception signals from the second duplexer to a connector of the additional unit and extracting transmission signals, which are to be applied to the second duplexer means, out of the signals from the connector of the additional unit; and
the cable includes:
a unique signal line coupled to the connectors of both of the portable device and the additional unit for transmitting the transmission and reception signals.

3. The radio telephone apparatus of claim 2 wherein the portable radio device comprises an earpiece and a mouthpiece and the additional unit comprises a speaker and a microphone and wherein the reception signals from the receiver means are selectively applied to either one of the earpiece or the speaker and audio signals from either one of the mouthpiece or the microphone are selectively applied to the transmitter means as transmission signals.

4. The radio telephone apparatus of claim 2 wherein the portable radio device comprises a first battery and the portable radio device is supplied with power from the first battery when the portable radio device is not connected with the additional unit and wherein the portable radio device and the additional unit are supplied with power from a second battery mounted in the vehicle when the portable radio device is connected to the additional unit through a power supply line included in the cable.

5. The radio telephone apparatus of claim 4 wherein the first battery is a rechargeable battery that is charged by the second battery when the portable radio device is connected to the additional unit through the power supply line.

6. The radio telephone apparatus of claim 2 wherein the additional unit includes a rest mechanism for receiving the portable radio device removably thereon.

7. The radio telephone apparatus of claim 2 wherein the unique signal line is a coaxial cable.

8. A radio telephone apparatus comprising a portable radio device, an additional unit connectable to the portable radio device through a cable, and a first antenna associated with the additional unit, wherein:
the portable radio device includes:
a portable antenna for receiving or transmitting radio frequency signals;
a first terminal connected to the portable antenna;
a second terminal connected to a connector of the portable radio device;
a third terminal;
first duplexer means, connected to the third terminal, for applying transmission signals to the third terminal and extracting reception signals out of the signals from the third terminal;
transmitter means, coupled to a transmission terminal of the first duplexer means, for providing transmission signals to the first duplexer means;
receiver means, coupled to a reception terminal of the first duplexer means, for receiving reception signals from the first duplexer means; and
switching means for selectively connecting the third terminal to either one of the first terminal or the second terminal;
the additional unit includes:
second duplexer means, coupled to the first antenna, for applying transmission signals to the first antenna and extracting reception signals out of the signals from the first antenna; and
third duplexer means, coupled to the second duplexer means, for applying the reception signals from the second duplexer means to a connector of the additional unit and extracting transmission signals, which are to be applied to the second duplexer means, out of the signals from the connector of the additional unit; and
the cable includes:
a unique signal line coupled to the connectors of both of the portable device and the additional unit for transmitting the transmission and reception signals.

9. The radio telephone apparatus of claim 8 wherein the portable radio device comprises an earpiece and a mouthpiece and the additional unit comprises a speaker and a microphone and wherein the reception signals from the receiver means are selectively applied to either one of the earpiece or the speaker and audio signals from either one of the mouthpiece or the microphone are selectively applied to the transmitter means.

10. The radio telephone apparatus of claim 8 wherein the portable radio device comprises a first battery and the portable radio device is supplied with power from the first battery when the portable radio device is not connected to the additional unit and wherein the portable radio device and the additional unit are supplied with power from a second battery associated with the additional unit when the portable radio device is connected to the additional unit through a power supply line included in the cable.

11. The radio telephone apparatus of claim 10 wherein the first battery is a rechargeable battery that is charged by the second battery when the portable radio device is connected to the additional unit through the power supply line.

12. The radio telephone apparatus of claim 8 wherein the additional unit includes a rest mechanism for receiving the portable radio device removably thereon.

13. The radio telephone apparatus of claim 8 wherein the unique signal line is a coaxial cable.

14. A radio telephone apparatus comprising a portable radio device, an additional unit connectable to the portable radio device through a cable, and a first antenna associated with the additional unit, wherein:

the additional unit includes:

a speaker;

a microphone; and first duplexer means, coupled to the first antenna, for applying transmission signals to the first antenna and extracting reception signals out of the signals from the first antenna;

the portable radio device includes:

an earpiece;

a mouthpiece;

a portable antenna for receiving or transmitting radio frequency signals;

second duplexer means, coupled to the portable antenna, for applying transmission signals to the portable antenna and extracting reception signals out of the signals from the portable antenna;

transmitter means, selectively supplied with transmission signals from either one of the mouthpiece or the microphone, for selectively providing the transmission signals to either one of the first duplexer means or the second duplexer means;

receiver means, selectively supplied with reception signals from either one of the first duplexer means or the second duplexer means, for selectively providing the reception signals to either one of the earpiece or the speaker;

the cable includes:

at least a high-frequency signal line for coupling the first duplexer means to the transmitter means and the receiver means; and at least two audio signal lines for connecting the receiver means to the speaker and for connecting the microphone to the transmitting means.

15. The radio telephone apparatus of claim 14 wherein the portable radio device comprises a first battery and the portable radio device is supplied with power from the first battery when the portable radio device is not connected to the additional unit and wherein the portable radio device and the additional unit are supplied with power from a second battery provided with the additional unit when the portable radio device is connected to the additional unit through a power supply line included in the cable.

16. The radio telephone apparatus of claim 15 wherein the first battery is a rechargeable battery that is charged by the second battery when the portable radio device is connected to the additional unit through the power supply line.

17. The radio telephone apparatus of claim 14 wherein the additional unit includes a rest mechanism for receiving the portable radio device removably thereon.

18. The radio telephone apparatus of claim 14 wherein the high-frequency signal line is a coaxial cable.

19. A radio telephone apparatus comprising a portable radio device, an additional unit supplied with power from a first battery and connectable to the portable radio device through a cable, and a first antenna associated with the additional unit, wherein:

the additional unit includes:

first duplexer means, coupled to the first antenna, for applying transmission signals to the first antenna and extracting reception signals out of the signals from the first antenna;

the portable radio device includes:

an earpiece;

a mouthpiece;

a second portable antenna for receiving or transmitting radio frequency signals;

second duplexer means, coupled to the second portable antenna, for applying transmission signals to the second portable antenna and extracting reception signals out of the signals from the second portable antenna;

transmitter means, supplied with transmission signals from the mouthpiece, for selectively providing the transmission signals to either one of the first duplexer means or the second duplexer means;

receiver means, selectively supplied with reception signals from either one of the first duplexer means or the second duplexer means, for providing the reception signals to the earpiece;

a rechargeable second battery supplied with power from the first battery when the portable radio device is connected to the additional unit for supplying power to the portable radio device when the portable radio device is connected to the additional unit; and the cable includes:

at least a high-frequency signal line for coupling the first duplexer means to the transmitter means and the receiver means; and a power supply line for transmitting power from the additional unit to the portable radio device.

20. The radio telephone apparatus of claim 19 wherein the additional unit includes a rest mechanism for receiving the portable radio device removably thereon.

21. The radio telephone apparatus of claim 19 further comprising a speaker and a microphone and wherein the reception signals from the receiver means are selectively applied to the speaker through a reception audio signal line included in the cable and the transmission signals from the microphone are selectively applied to the transmitter means through a transmission audio signal line included in the cable.

22. The radio telephone apparatus of claim 19 wherein the high-frequency signal line is a coaxial cable.

23. A radio telephone apparatus comprising a portable radio device, an additional unit connectable to the portable radio device through a cable, and a first antenna associated with the additional unit, wherein:

the additional unit includes:

a rest mechanism for receiving the portable radio device removably thereon;

first duplexer means, coupled to the first antenna, for applying transmission signals to the first antenna and extracting reception signals out of the signals from the first antenna;

the portable radio device includes:

an earpiece and a mouthpiece confronting the rest mechanism and facing downwardly when the portable radio device is received by the rest mechanism;

a control panel provided at a top surface opposite the location of the earpiece and the mouthpiece for inputting various commands to the radio telephone apparatus;

a second antenna for receiving or transmitting radio frequency signals;

second duplexer means, coupled to the second antenna, for applying transmission signals to the second antenna and extracting reception signals out of the signals from the second antenna;

transmitter means for providing transmission signals applied from the mouthpiece to the second duplexer means when the portable radio device is not connected to the additional device and for providing transmission signals applied from the microphone to the first duplexer means when the portable radio device is connected to the additional unit;

receiver means for providing reception signals applied from the second duplexer means to the earpiece when the portable radio device is not connected to the additional device and for providing reception signals applied from the first duplexer means to the earpiece when the portable radio device is connected to the additional unit; and the cable includes:

at least a high-frequency signal line for coupling the first duplexer means to the transmitter means and the receiver means.

24. The radio telephone apparatus of claim 23 wherein the rest mechanism comprises pawl means for engaging the portable radio device on a first surface and disengaging means for releasing the engagement with the portable radio device.

25. The radio telephone apparatus of claim 23 wherein the additional unit comprises a speaker and a microphone and wherein, in the event the portable radio device is connected to the additional unit, an output signal from the receiver means is applied to the speaker instead of the earpiece through a reception audio signal line included in the cable when the portable radio device is received by the rest mechanism and an audio signal from the microphone instead of the mouthpiece is applied to the transmitter means through a transmission audio signal line included in the cable when the portable radio device is received by the rest mechanism.

26. The radio telephone apparatus of claim 23 wherein the portable radio device comprises a first battery and the portable radio device is supplied with power from the first battery when the portable device is not connected to the additional unit and wherein the portable radio device and the additional unit are supplied with power from a second battery connected to the additional unit when the portable device is connected to the additional unit.

27. The radio telephone apparatus of claim 26 wherein the first battery is a rechargeable battery and is charged by the second battery when the portable device is connected to the additional unit.

28. The radio telephone apparatus of claim 23 wherein the high-frequency signal line is a coaxial cable.

* * * * *